(12) United States Patent
Prevor et al.

(10) Patent No.: US 10,081,320 B2
(45) Date of Patent: Sep. 25, 2018

(54) ADJUSTABLE LENGTH COMPLETE COVERAGE BUMPER GUARD

(71) Applicants: Grant Eliot Prevor, Hoboken, NJ (US); Sunny Lam, Shanghai (CN)

(72) Inventors: Grant Eliot Prevor, Hoboken, NJ (US); Sunny Lam, Shanghai (CN)

(*) Notice: Subject to any disclaimer, the term of this patent is extended or adjusted under 35 U.S.C. 154(b) by 63 days.

(21) Appl. No.: 15/405,864

(22) Filed: Jan. 13, 2017

(65) Prior Publication Data

US 2017/0210320 A1 Jul. 27, 2017

Related U.S. Application Data

(60) Provisional application No. 62/281,987, filed on Jan. 22, 2016.

(51) Int. Cl.
*B60R 19/44* (2006.01)
*B60R 19/02* (2006.01)

(52) U.S. Cl.
CPC ............ *B60R 19/44* (2013.01); *B60R 19/023* (2013.01)

(58) Field of Classification Search
CPC .............................. B60R 19/44; B60R 19/023
See application file for complete search history.

(56) References Cited

U.S. PATENT DOCUMENTS

| 9,358,942 | B1* | 6/2016 | Tekavec | B60R 19/023 |
| 9,840,216 | B2* | 12/2017 | Dagrossa | B60R 19/44 |
| 2017/0174161 | A1* | 6/2017 | Dagrossa | B60R 19/44 |

* cited by examiner

*Primary Examiner* — Lori L Lyjak
(74) *Attorney, Agent, or Firm* — Chambliss, Bahner & Stophel, P.C.

(57) ABSTRACT

A modular component bumper guard for protecting vehicles from damage caused by parking collisions. The guard includes a main body, two side pieces, two impact absorbing pads, and two straps. A "field of loops" on the vehicle side of the main body of the guard give the guard its adjustable in length and adjustable positioning properties. The guard is temporarily attached to a vehicle's bumper and wraps around its fenders to absorb the impact of colliding objects. It may be easily attached and detached from a vehicle with two or more bungee cords with hook fittings and/or two or more suction cups with handles. Impact absorbing pads secured solely by hook and loop fastener straps add an extra level of protection and potential customization.

17 Claims, 6 Drawing Sheets

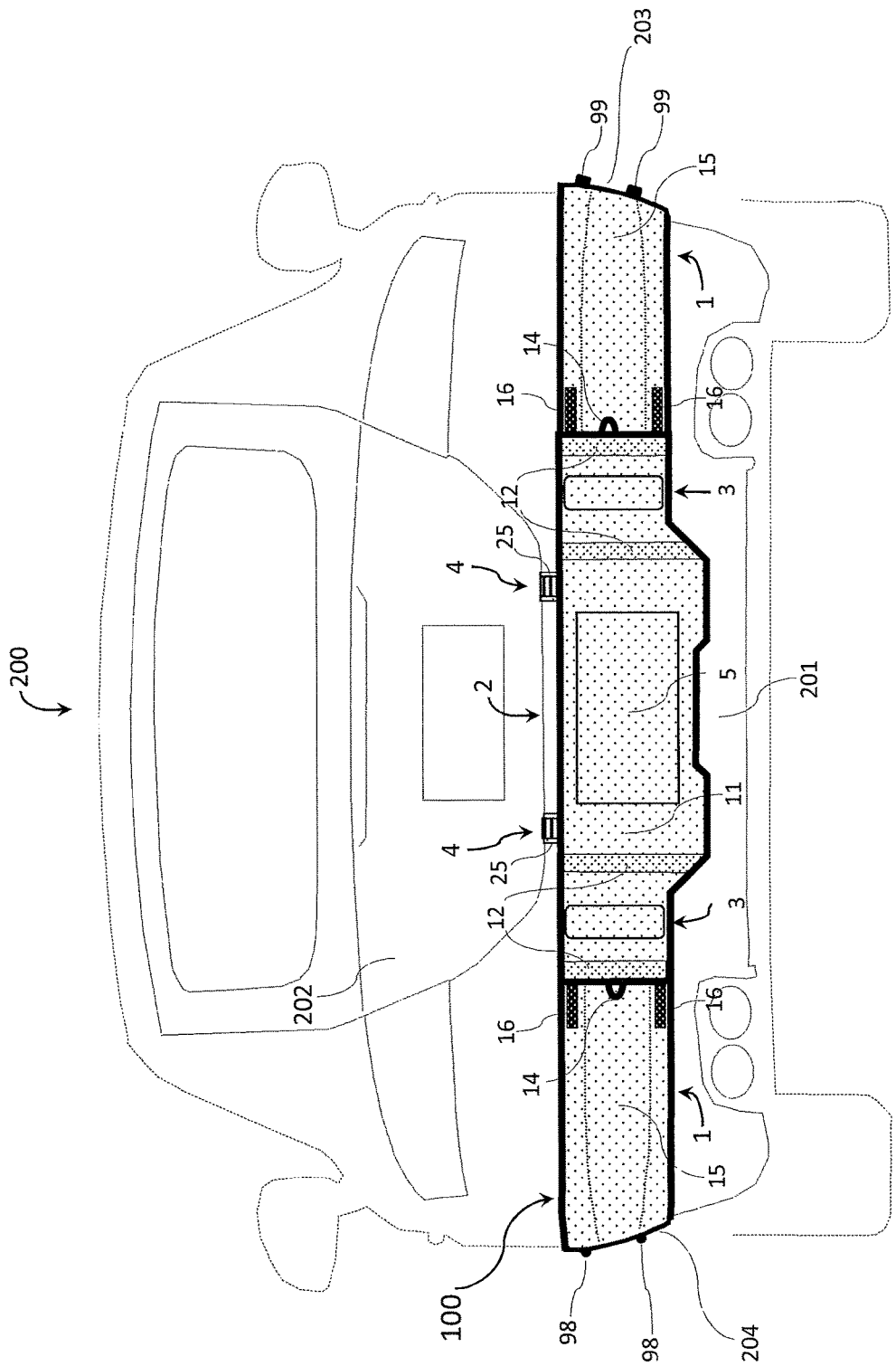

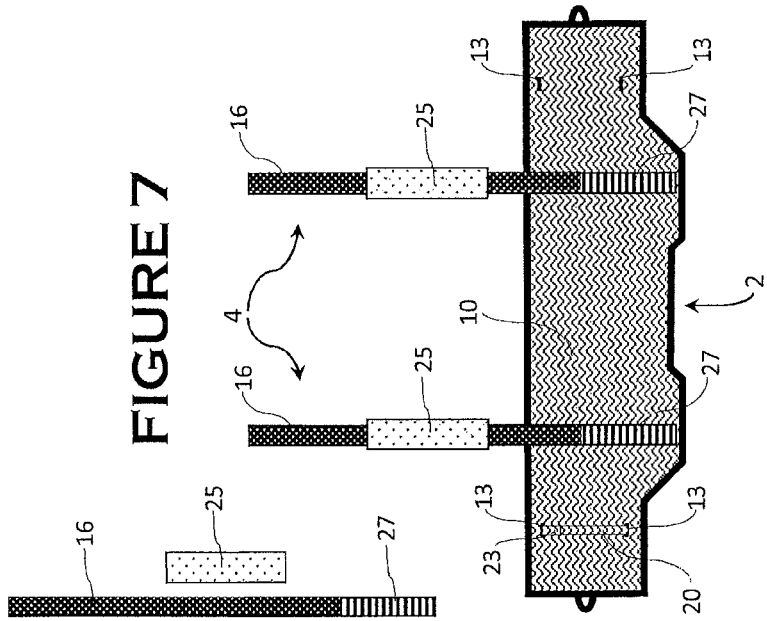
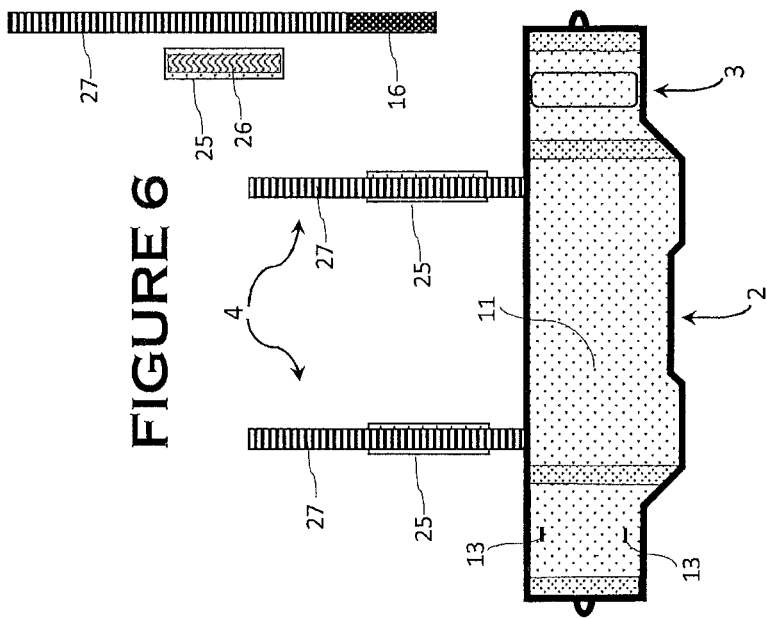

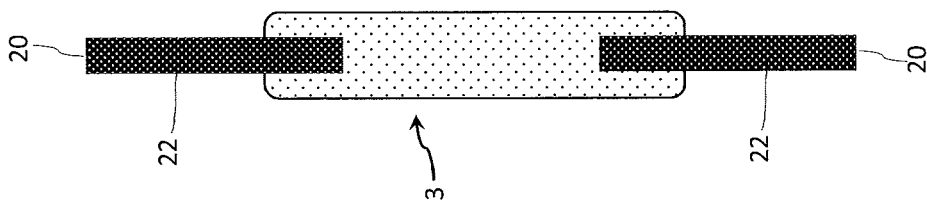
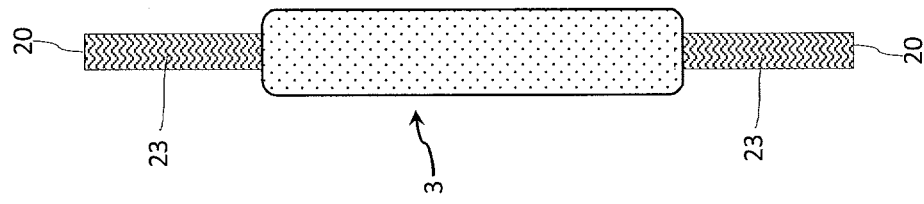
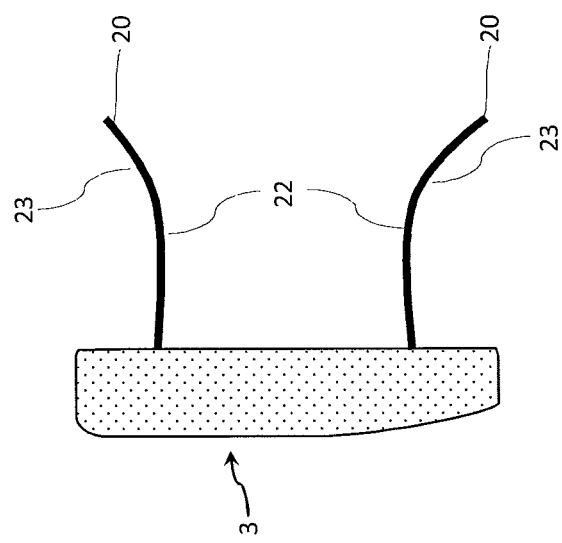

ADJUSTABLE LENGTH COMPLETE COVERAGE BUMPER GUARD

CROSS-REFERENCE TO RELATED APPLICATIONS

This applications claims priority to and claims the benefit of U.S. Provisional Patent Application Ser. No. 62/281,987, entitled "Adjustable Length Complete Coverage Bumper Guard," filed Jan. 22, 2016, the entire content of which is incorporated herein by reference.

BACKGROUND

Field of the Invention

The present invention relates to the field of vehicle bumper protection. Specifically it relates to a protective cover or shroud which is adhered or attached to a vehicle's bumper and is meant to absorb minor impacts from vehicle to vehicle contact during parallel parking, thus preventing scratches, dings, and lacerations to the vehicles delicate painted surface. In particular it relates to a universal size protective guard which is capable of covering and protecting the entire surface of a typical passenger vehicle's bumper.

Description of the Related Art

As anyone who lives in a congested and overpopulated city can attest, parking is at a premium as of late in many neighborhoods. The lack of conveniently available and low or no cost street parking spaces means people are parking literally on top of each other and cramming their cars into parking spaces too small to comfortably get in and out of. As most street parking consists of parallel parking spots, a driver's parking skills and spatial judgment are put to the test daily and a vehicle's front and rear bumpers are often susceptible to contact with other parking or parked vehicles. Even the most skilled drivers, can misjudge or commit error when the available space and vehicle size are a close mismatch, leading to unwanted and often damaging vehicle to vehicle contact. This low velocity vehicle to vehicle contact is no longer a rarity, it occurs every day on every overly congested street where parking is at a shortage. It cannot therefore be regarded as accidental as the parking driver is well aware they are hitting stationary vehicles, sometimes multiple repetitive times, and generally their expected goal is to minimize contact and limit damage as opposed to genuinely expecting to avoid it altogether. In common slang this type of contact is referred to as a "love tap" denoting a non-intention to cause any harm but acknowledging the unavoidable necessity to make contact with the stationary vehicle or vehicles. Compounding the problem is the fact that the automobiles of today are being produced with light weight painted plastic bumper covers which are highly susceptible to damage from vehicle to vehicle contact during parallel parking. Although this damage is generally only paint damage and minor surface lacerations of the vehicle's plastic bumper cover, the accumulation of these minor scratches can strongly detract from a vehicle's overall appearance and cause the owner victim to either be unhappy with the appearance of their vehicle or force them to pay continuously for costly paint and surface repairs at a professional auto body shop. The high incidence of these minor parking incidents in major cities and areas where parking is at a premium, have led to the marketing of bumper protection guards. Several products now exist and are growing in popularity for the protection of painted vehicle bumpers. The most popular by sheer number are essentially rubber mat shrouds which hang out of a vehicles trunk suspended by straps which adhere to the vehicles trunk carpet liner. These products are inexpensive, highly convenient, and easy to store yet they only protect the rear portion of the vehicles bumper and thereby completely neglect the corners and sides of the bumper which are most highly susceptible to damage from parallel parking maneuvers. During parallel parking the angle of entry or exit of the parking space (generally around forty five degrees) makes the corners of the stationary car the first and most likely victim of initial "accidental" contact. Therefore, a vehicle's bumper is not fully protected when only the center rear of the vehicle is being covered by these popular rubber mat shrouds. Properly protecting a vehicles entire bumper is a challenge when convenience of use, aesthetics, and non-permanence of installation are all considered paramount design considerations. Other products which have been designed to cover the entire or most of the vehicles bumper, have failed to satisfy demanding consumer's preferences. Some available products must be purchased in limited available specific sizes (based upon the guards manufacturers' opinions of what constitutes a small, medium, or large vehicle), which does not ensure a desired custom fit length and truly guarantee the complete protection the consumer desires. Furthermore, since many of these products are intended for use only once parked—to protect a stationary vehicle from falling victim to another driver's accident, many of these products have not been designed to be securely attached to the vehicle and cannot be safely used while driving the vehicle. Therefore, these products offer no protection for the offensive mobile vehicle which may itself be "accidentally" committing the offending contact while parking in a tight spot. These products are also generally oversized and bulky and take up too much trunk space when not in use, and for many users can be difficult to attach and detach from the vehicle without a second individual's assistance. Furthermore, as many of these products are designed for parking garage use and not for street parking or other outdoor use, their materials of construction are not intended to ever get wet from the rain limiting their benefit to a street parker.

SUMMARY

The intent of the present invention is to offer a bumper guard which:
  Can protect the entire bumper surface from low speed impacts during parallel parking thereby preventing scratches and paint damage from occurring.
  Can be easily attached and detached from the vehicle by a single individual.
  Can be easily custom sized and resized (re-usable on future cars) by the end-user (without the use of any tools or in-depth level of training) to offer complete bumper coverage for the majority of popular consumer automobiles on the market.
  Can be securely attached to the vehicle and safe to drive with attached.
  Can conform to the vehicle's unique contours and not detract from its stylish appearance.
  Can be easily and compactly stored when not in use.
  Can withstand the natural elements and be long lasting and durable.
  Can be machine washable to keep its appearance always fresh and clean.

Can act as a canvas for sponsored advertising messages or personal adornment.

BRIEF DESCRIPTION OF THE DRAWINGS

A more complete understanding of the present invention Adjustable Length Complete Coverage Bumper Guard may be had by reference to the following detailed description when taken in conjunction with the accompanying drawings, wherein:

FIG. 5—is a front view of the assembled present invention installed on a vehicle's rear bumper.

FIG. 6—is a front side view of the present invention's "Main Body".

FIG. 7—is a back side view of the present invention's "Main Body".

FIG. 8A—is a side/profile view of the present invention's "Impact Absorbing Pad" and connecting straps.

FIG. 8B—is a front side view of the present invention's "Impact Absorbing Pad" and connecting straps.

FIG. 8C—is a back side view of the present invention's "Impact Absorbing Pad" and connecting straps.

Figure 1:
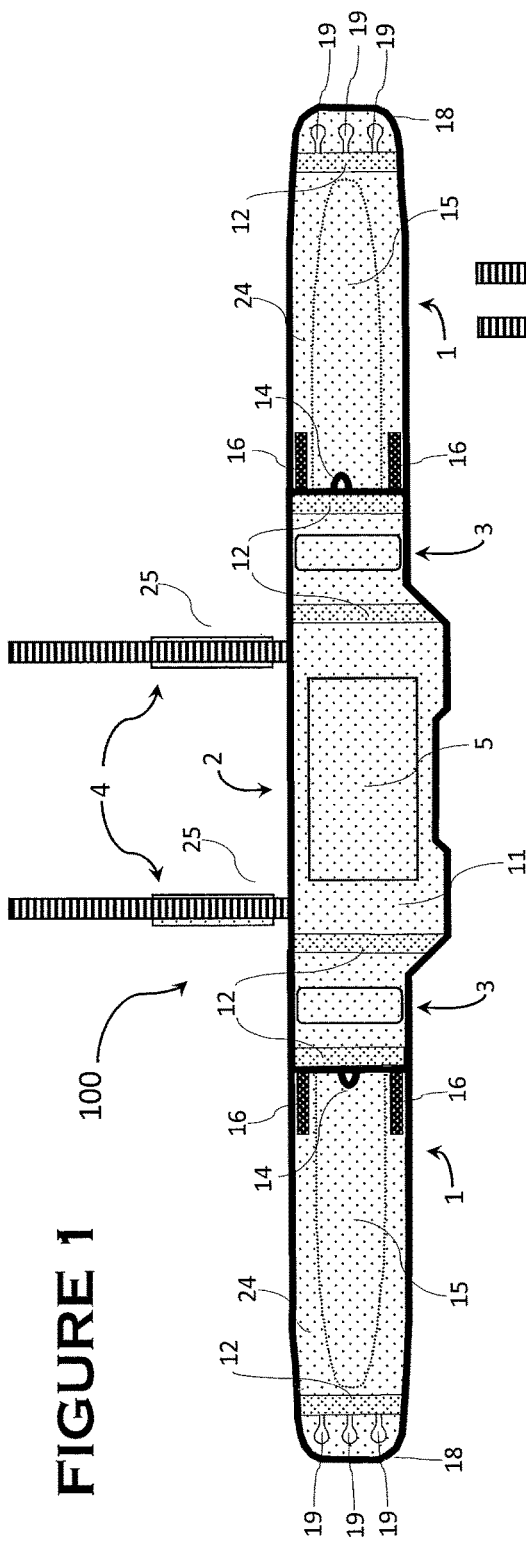
FIG. 1—is a front view of the assembled but not installed present invention.

Where used in the various figures of the drawings, the same numerals designate the same or similar parts. Furthermore, when the terms "top," "bottom," "first," "second," "upper," "lower," "height," "outer," "inner," "width," "length," "end," "side," "horizontal," "vertical," and similar terms are used herein, it should be understood that these terms have reference only to the structure shown in the drawing and are utilized only to facilitate describing the invention.

All figures are drawn for ease of explanation of the basic teachings of the present invention only; the extensions of the figures with respect to number, position, relationship, and dimensions of the parts to form the preferred embodiment will be explained or will be within the skill of the art after the following teachings of the present invention have been read and understood. Further, the exact dimensions and dimensional proportions to conform to specific width, length, and similar requirements will likewise be within the skill of the art after the following teachings of the present invention have been read and understood.

Preferred embodiments of the Adjustable Length Complete Coverage Bumper Guard according to the present invention will now be described in detail with reference to the accompanying drawings.

DETAILED DESCRIPTION

The Present invention 100 as illustrated in FIG. 1 relates to an adjustable in length vehicle bumper guard 100 which protects the majority of a typical vehicle's front or rear bumper from minor abrasions and scratches inflicted by contact with other vehicles during parallel parking incidents.

Figure 2:
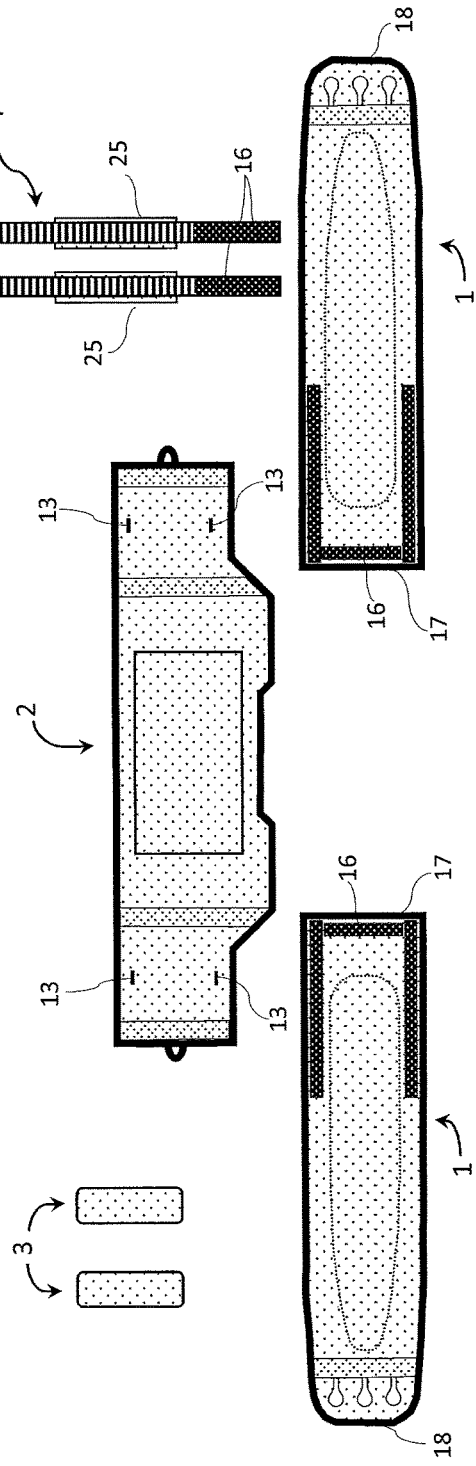
FIG. 2—is a front view of the primary modular components which assemble to create the present invention.
Figure 3:
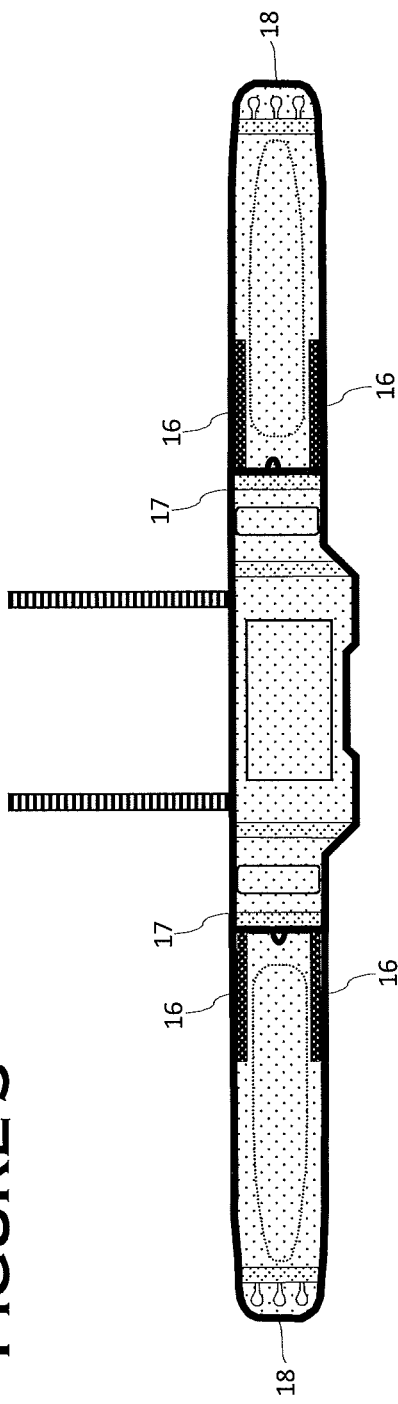
FIG. 3—is a front view of the assembled but not installed present invention in its longest configuration.
Figure 4:
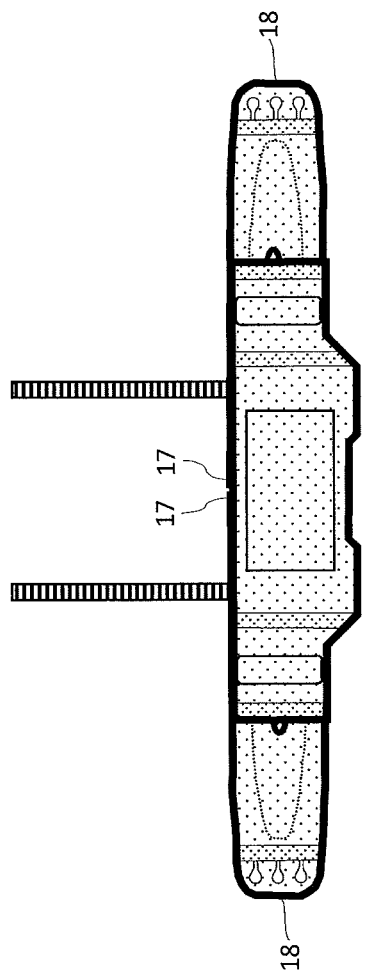
FIG. 4—is a front view of the assembled but not installed present invention in its shortest configuration.

In the following described preferred embodiment the Adjustable Length Complete Coverage Bumper Guard (hereinafter "guard") 100 is capable of being properly sized to protect the rear bumper of the majority of consumer automobiles driven today in the United States. It consists of multiple primary modular components 1,2,3,4 which are illustrated in FIG. 2. These modular components are ultimately positioned and assembled or attached to each other (as illustrated in FIG. 1) by a method which mimics hook and loop fasteners (Velcro™) at different positions or intervals depending on the length of the vehicles bumper 201 and fender 203 (wheel well 204 to wheel well 204 length) and the specific shape and uniquely contoured surfaces of the vehicle 200. Referring to FIG. 1 and FIG. 2, the entirety of the preferred embodiment invention's components 100 include; a main center body 2, two side pieces 1, two straps 4, and two impact absorbing pads 3. As illustrated in FIG. 5 the invention 100 is meant to be primarily secured to a vehicle by means of its two modular straps 4 which are placed inside the vehicle's trunk 202 (adhering to the carpet liner surface within the trunk 202) when used as a rear bumper guard or under the hood of the vehicle 200 when used as a front bumper guard. The extremities 18 of the side pieces 1 of the assembled guard 100 wrap around the bumper 201 of a vehicle 200 and secure to an area of the front or rear fender 203 of the vehicle 200 with one or more suction cups 99 (as illustrated on the right hand passenger side of the vehicle 200 in FIG. 5) or attach to the vehicle's wheel well 204 by use of two bungee cords 98 each with two hook fittings (as illustrated on the left hand driver side of the vehicle 200 in FIG. 5). The preferred embodiment being contemplated by the inventor allows for the positioning of these side pieces 1 behind the main body 2 at any interval from center of main body 2 (side pieces 1 are end 17 to end 17 in this configuration) to outer side edge width extremities of main body 2. In the preferred embodiment the guard 100 could achieve a smallest assembled configuration of 174 cm/68.5" as illustrated in FIG. 4 and a longest assembled configuration of up to 264 cm/103.93" as illustrated in FIG. 3. This range of size would ensure complete bumper coverage for the vast majority of common passenger vehicles currently on the road. This ability to adjust the guard 100 to any interval length within this range is a unique attribute of the invention which allows the manufacturer of the guard 100 to only need to produce one model or size limiting their inventory and cost to manufacture, stock, sort, and package the product. Distributors and retailers of the product have only one SKU (Stock Keeping Unit) and do not need to manage inventory of various sizes or take up valuable shelf space in their warehouses or retail stores carrying slower moving SKUs. End users can purchase the product and be assured it will fit their future vehicles if and when they replace their current car.

In this preferred embodiment, the main center body 2 is constructed of a semi rigid high density EVA (Ethyl Vinyl Acetate) foam layer (approximately 6 mm/0.25" thick) sandwiched between two distinct laminated layers of fabric (polyester and felt). The width of the main center body 2 is approximately 100 cm/39" and its height (at its tallest point) is 28.5 cm/11.22". The main center body's 6 mm/0.25" thick foam layer is flexible enough along its width to allow it to conform to the vehicles unique geometry, yet rigid enough to absorb minor low speed impacts and thereby protect the surface of the vehicle from damage a minor (less than 1

MPH) rear impact would have otherwise caused a vehicle's painted surface. This singular component 2 is capable of covering the majority of the rear side of a passenger vehicle similar to the common and known art presently popular among consumers previously disclosed. If a vehicle 200 has its rear license plate positioned on the trunk surface 201 then no modification of the main body 2 is required as is the case in the illustrated example of FIG. 5. For vehicles which have their rear license plates positioned on the rear bumper, the rectangular area/section 5 of the main body 2 would obstruct view of the license plate necessitating its removal. Either a variant model of the guard could be manufactured with a premade void at this area/section 5 of the main body 2 or this section could be cut-out by the end user using a sharp and accurate blade. The vehicle side surface (under-side/back-side) 10 of the main center body 2 as illustrated in FIG. 7 is lined with a soft to the touch felt cloth fabric which acts as a "field of loops" (simulating or mimicking negative or female Velcro™ loops). The physical properties of this fabric's surface strongly adheres to hooks (positive or male Velcro™). Since the entire surface 10 is in effect a canvas of negative/loops it offers the unique utility that any male or positive/hook Velcro™ will securely adhere to any portion of this surface area allowing for ultimate flexibility in positioning of the other primary modular components side pieces 1 and straps 4 of the invention 100. The outer side surface (visible/exposed when attached side) 11 of the main center body 2, is an attractive tightly woven synthetic fabric such as polyester which can be adorned by silkscreen or heat transfer to display a personal or commercial marketing/advertising message or be used to adhere bumper stickers or other contemplated adornments. Four reflective stripes 12 of reflective fabric adorn this visible outer layer 10 to maximize visibility of the vehicle in the dark and possibly replace original vehicle reflectors which the guard 100 may be covering and blocking when attached to the vehicle 200. Two pairs of slits 13 are cut into the main center body 2 at the left and right sides leaving four voids through the 6 mm/0.25" thickness of the main center body 2. These slits 13 allow for the attachment of accessory options such as impact absorbing pads 3 (illustrated in FIGS. 8A, 8B, and 8C) which can optionally be added to the guard and attached by feeding their two double sided Velcro™ straps 20 through the slits and tightly wrapping around to the under-side/back-side felt fabric and then overlapping each other as illustrated in FIG. 6 and FIG. 7 which show one side of the guard with the impact absorbing pad 3 installed and the other side without it installed. Additionally, the main center body 2 has two elastic loops 14 on its opposing ends. These elastic loops 14 enable the main center body to attach to suction cups 99 which are then secured to the vehicle body. This allows the user the option of using only the main center body 2 of the invention and foregoing the side pieces 1 entirely if they prefer not to attach them or if the vehicle is too small and does not require them.

The two side pieces 1 are identical to each other (left and right) and in a preferred embodiment of the invention are contemplated to be made out of 3 mm/0.125" thick neoprene foam rubber either sandwiched between two layers of polyester fabric or only having polyester fabric adhered/laminated on its outer visible when assembled side 24. The neoprene has a low coefficient of friction which allows the side pieces to cling and not slip from the vehicle surface, however this may make it difficult to adjust and pull the guard on the vehicle so a polyester fabric may be preferred even though there will be a loss of the frictional benefits the un-laminated neoprene can offer. The outer side (visible/exposed when attached side) 24 is an attractive tightly woven (matching the main center body's fabric) synthetic fabric such as polyester which can be adorned by silkscreen or heat transfer to display a marketing/advertising message. An overlay of 3 mm/0.125" thick EVA foam (also sandwiched between two layers of nylon or polyester fabric) 15 is stitched along most of their surface length to add a protective layer element to the corners of the vehicle (corner pads). The outer side (visible/exposed when attached side) surface of this stitched on overlay is also an attractive tightly woven synthetic fabric such as polyester which can be adorned by silkscreen or heat transfer to display a marketing/advertising message. The neoprene and its fabric layer or layers are somewhat elastic and allow the guard to stretch to conform to the vehicles shape and contours. The side pieces 1 are meant to attach by horizontal as well as vertical rows/strips of stitched on positive/male/hooked Velcro™ 16 to the back-side of the main body's "field of loops" of felt fabric 10 on one end of their length 17 and attach to either the wheel well 204 with a bungee cord with hook fittings 98 or to the side/corner area of the bumper or fender 203 with one or more suction cups 99 on the other end of their length 18. The vertical strips of stitched on positive/male/hooked Velcro™ 16 provide a strong enough connection to bond the side pieces 1 to the main body 2 all by themselves. The horizontal rows of stitched on positive/male/hooked Velcro™ have been added to the guard 100 to ensure the horizontal extremities of the main body 2 of the guard 100 will never curl upward and away from the vehicle as a result of wind force which could otherwise possibly deform the main body 2 and prevent it from lying flat against the bumper surface 201 of the vehicle 200. The preferred embodiment of the side-piece has three button holes or reinforced by stitching slits 19 which double as either bungee cord 98 or suction cup 99 attachment areas. Any of these button holes/slits 19 or all simultaneously can be used to attach to one or more suction cups 99 which are firmly attached to the vehicle's fender area and/or a bungee cord with hook fittings 98 attached to the vehicles inner wheel well 204 as illustrated in FIG. 5. This embodiment allows for a wide array of possible positioning and attachment options to ensure that most if not all vehicles can make good use of the products components and achieve a secure and safe temporary attachment (with no tools or adhesives required).

The two straps 4 as illustrated in more detail in FIG. 6 and FIG. 7 are identical (either could be the left or right side strap) to one another and are approximately 90 cm/35" in length each and are each no wider than 50 mm/2". They are constructed from water resistant webbing/synthetic fiber strapping 27 (similar to that which is customarily used in tote bags to carry them over the shoulder) which has had positive/hook Velcro™ strips 16 stitched to both sides at different positions so the straps can attach to the back-side/under-side of the main center body 10 on one end and the vehicles' trunk liner fabric on the other end. As the straps 4 are not permanently attached to the main center body 2 they can be positioned anywhere on its rear surface 10 allowing them to fit most any vehicles' unique shape and size and allow the end-user to select how wide apart and how long they extend and specifically where and at what angle they attach to the vehicle 200. As every vehicle is shaped differently this advantage of anywhere positioning of the straps 4, adds to the appeal and final appearance of the applied guard 100. The straps 4 in other words go wherever the user wants them to go instead of the straps' 4 location on the guard dictating how they must be attached to the vehicle 200. The straps 4 are contemplated by the inventor to include removable and repositionable strips of neoprene 25 with stitched on strips of negative/loop Velcro™ 26 on one side to be positioned on the portion of the strap that sits on the trunk rim. This neoprene strip could act as a cushion and prevent the straps themselves from causing any scratches on painted surfaces it makes contact with on the trunk rim. The two straps 4 serve multiple purposes. They are used to center the position and height of the main center body 2 on the vehicle 200 and support its weight. They suspend the main center body 2 while the user positions and attaches or detaches the side pieces 1 to the wheel well 204 or fender 203 allowing the task to be completed by one single person without assistance. In one embodiment of the invention the straps 4 and their attached neoprene strips 25 act as a protective raceway for a flat ribbon style low voltage wire connecting a battery pack with a vibration/noise activated sensor to an LED (light emitting diode) panel secured on the main center body 2 (more about this below). Once the side pieces 1 are securely attached and pulling the entirety of the bumper guard 100 tightly across the horizontal length of the bumper and its corners, the straps 4 keep the bumper guard 100 centered on the vehicle and continue to hold some of its weight. The straps 4 act as a crucial backup attachment if either of the connections of the side pieces 1 to the vehicle via bungee cord 98 or suction cup 99 on either side were to fail thus preventing the guard 100 from detaching from the vehicle while driving which could at worst cause an accident or at least cause the guard 100 to be lost or damaged.

The two impact absorbing pads 3 can take the form of a variety of embodiments. They may be constructed either entirely of foam or rubber (or other various contemplated materials) or be pouches constructed of fabric which encase foam or rubber centers. In one preferred embodiment, as illustrated in FIGS. 6, 7, 8A, 8B, and 8C, they will attach with double sided hook and loop Velcro™ straps 20 through the slits 13 in the main center body 2. The double sided Velcro™ straps 20 have a hook side 22 and a loop side 23 and they are oriented to allow for one strap to firstly stick to the "field of loops" on the underside of main body 10 and then allow the second strap to overlap the first which creates a very secure and tamper-proof connection to the main body 2 and replaces the area of the "field of loops" with new loops provided by the loop side 23 of the second overlaying strap, thereby allowing for the entire area of the underside of main body 10 to remain a "field of loops" fully available for hook and loop connection with the side pieces' 1 main body 2 attachment end 17 and its three positive/hook Velcro™ strips 16 as well as attachment of the straps 4 if this happens to be the location they choose to place them. The thickness and projection of the "impact absorbing pads 3 off of the main center body 2 outer surface 11 adds an element of protection the flat conforming surface of the guard 100 does not convey on its own. The impact absorbing pads 3 create a visual appearance of heavy duty protection akin to a fender hanging of the side of a boat. In one embodiment their functional intent is to absorb direct impacts from another vehicles bumper and add a more pronounced spacing between the two cars. Often drivers when squeezing their car into a tight parking spot will inch forward till they hit the car in front of them not being able to judge this distance remaining and needing every available inch possible. The impact absorbing pads 3 will take many of these direct low speed hits and prevent the offending driver from doing any real damage to the parked car by forcing him/her to keep their further distance. As these pads 3 are made of foam such as EVA or EPE they can be molded or shaped into any form or size the imagination can provide. They can run horizontally or vertically on the surface of the main body 2. They can be offered to the consumer in a variety of shapes and colors or do it yourself kits to add an adornment element of personalization and uniqueness to the guard. For instance, skull and crossbones or football shaped for boys, lipstick or high heeled shoe shaped for girls, three dimensional team logos or helmets, caricatures, seasonal holiday symbols such as pumpkins or Santa Claus etc . . . . Marketers may wish to create foam versions of their products such as a soda can or bottle emblazoned with their company logo or a special promotional shape or image the possibilities are endless. The utility of the slits 13 and hook and loop straps 20 allows this adornment to be temporary and easily changed by the end user. In another preferred embodiment of this element of the invention, an EL (Electro Luminescence) LED panel takes the position of the impact absorbing pad 3. It could be mounted using the very same Velcro™ attachment method 20 either directly on the main center body 2 surface 11 or mounted on an intermediary foam layer which in turn would mount on 11. Its low voltage wires (flat ribbon style) would run through the slits 13 in the main center body 2 and up the straps 4 to a battery pack in the protective and secure trunk of the vehicle 202. The battery pack or in another embodiment an intermediary sensor device would contain a sound activated/vibration activated sensor which allows power to flow to the LED panel when vibrations are sensed only. As the driver of the vehicle listens to the radio, the music's sound waves would cause the panel to light up. When the vehicle is parked, any tap on the bumper 201 or any other part of the vehicle 200 will cause the EL Panel to temporarily light up due to the same sensing of vibration. This light would signal the other driver that he/she is too close to the guarded vehicle 200 and possibly lead to him/her to use more caution and not further strike the parked car.

The bungee cords with hook fittings 98 are contemplated to be 300 mm/12" or more in length and the hook fittings are sized and oriented to fit a variety of vehicles' wheel wells 204. An EVA foam sleeve/tube/straw wraps around the hook fittings to prevent direct contact with the vehicle which could possibly cause scratching. Some vehicles have small holes in the wheel wells which fit the pointy end of a hook while others have L-Shaped overhangs in the wheel well that a hook can grip when under tension from the bungee cord elasticity. By providing three button holes/slits 19 in the side pieces 1 the end-user can loop the unneeded length of the bungee cord 98 through these holes as many or as few times as necessary to provide a proper tension and fit length. As the weight of the guard is primarily the burden of the straps 4 emanating from the closed trunk 202, the side pieces 1 must only be applied with enough tension to guarantee the guard assembly 100 is tightly covering the vehicles surface and corners and will not shift or detach from the wheel wells 204 or suction cups 99 un-intentionally.

Figure 9A:
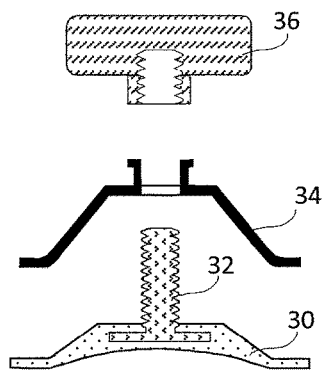
FIG. 9A—is a section view of an example embodiment of a suction cup utilized by the preferred embodiment of the present invention.
Figure 9B:
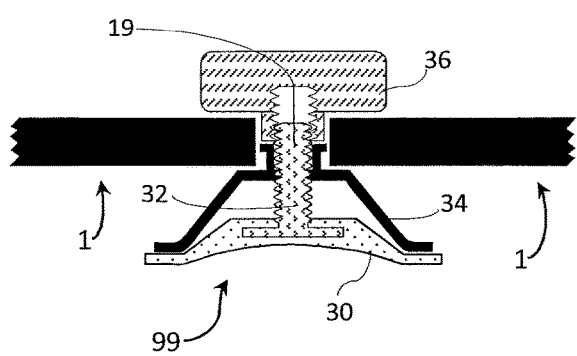
FIG. 9B—is a second section view of the suction cup shown in FIG. 9A, showing the placement of suction cup with respect to the thickness of a side piece of the present invention.
Figure 9C:
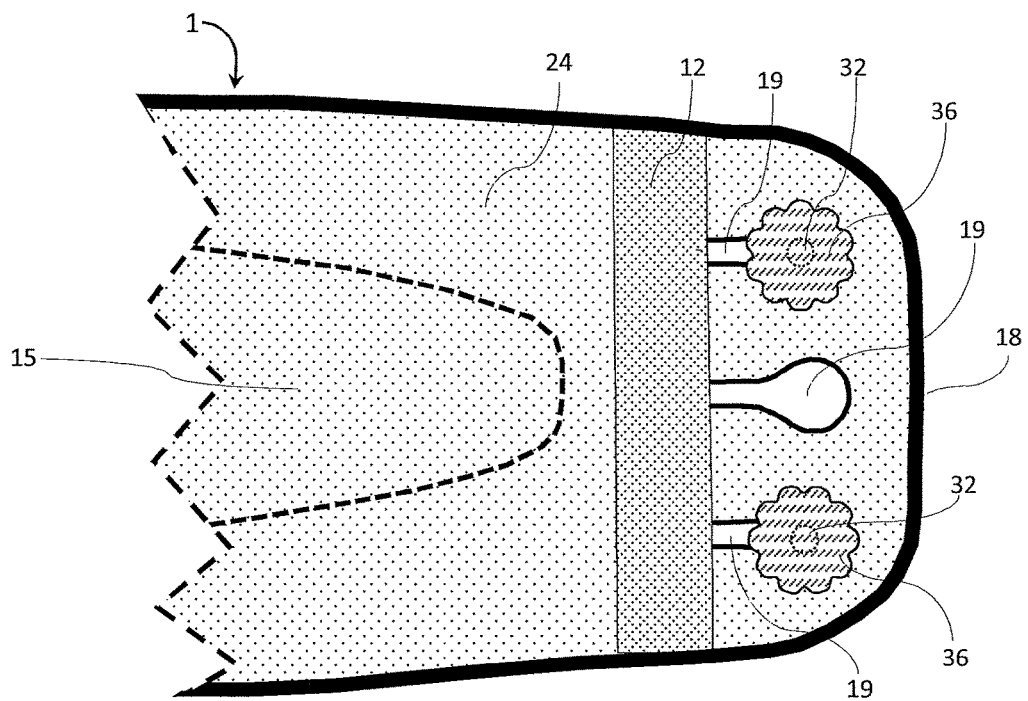
FIG. 9C—is a close-up partial view of one end of a side piece of the present invention, showing the placement of suction cups on the guard assembly.

The suction cups 99 being utilized in this preferred embodiment as illustrated in FIG. 9B, are comprised of three modular components as illustrated in FIG. 9A; a silicone cup 30 with a threaded rod 32 in its center, a hard plastic outer cup 34, and a tightening knob 36. As one turns the knob 36 the plastic cup 34 pushes the silicone cup 30 tighter and tighter against the surface 203 of the vehicle 200 evacuating the air and creating a vacuum suction adhering the suction cup 99. As illustrated in FIGS. 9B and 9C, the side piece slits or button holes 19 of the side pieces 1 have been intentionally sized to tightly slip over the tightening knob 36 securely ensuring the guard 100 is firmly and deliberately attached to the suction cups 99. Once positioned favorably, the suction cups 99 can be left in place and the guard 100 removed by unbuttoning it (as one would unbutton a shirt) from the knob 36, allowing the user to leave the suction cups 99 in place on the vehicles fender 203 for their next use saving them the time and effort involved in their placement.

What is claimed is:

1. A bumper protector for protecting a vehicle body from damage during low-speed impacts, said bumper protector comprising:
   (a) a central guard member adapted to cushion the impact of foreign objects with the vehicle body, said central guard member being adapted to fit over a portion of the vehicle body; and
   (b) at least two peripheral guard members adapted to wrap around corners of the vehicle body, each said peripheral guard member having a first end and a second end, each said peripheral guard member including means for releasably and adjustably attaching said first end to said central guard member, each said peripheral guard member including means for releasably securing said second end to the vehicle body.

2. The bumper protector of claim 1 further comprising at least two securing straps adapted to be releasably and adjustably attached to said central guard member, each said securing strap having a proximal end and a distal end, said proximal end having means for releasably and adjustably attaching said securing strap to said central guard member, said distal end having means for releasably securing said distal end to the vehicle.

3. The bumper protector of claim 1 wherein said central guard member is adapted to receive impact-absorbing pads.

4. The bumper protector of claim 3 wherein said impact-absorbing pads include rubber or a foam material.

5. The bumper protector of claim 1 wherein said central guard member includes means for securing said central guard member to the vehicle body.

6. The bumper protector of claim 5 wherein said means for securing said central guard member to the vehicle body include suction cups.

7. The bumper protector of claim 1 wherein said central guard member includes an outboard surface and wherein said outboard surface includes a reflective element.

8. The bumper protector of claim 1 wherein said peripheral guard members include a neoprene foam rubber.

9. The bumper protector of claim 1 wherein said peripheral guard members include a cushioning layer of ethyl vinyl acetate foam.

10. The bumper protector of claim 1 wherein said means for releasably and adjustably attaching said first end of said peripheral guard member to said central guard member includes hook-and-loop fasteners.

11. The bumper protector of claim 1 wherein said means for releasably and adjustably attaching said proximal end of said securing strap to said central guard member includes hook-and-loop fasteners.

12. The bumper protector of claim 1 wherein said means for releasably securing said second end of said peripheral guard member to the vehicle body includes at least one suction cup.

13. The bumper protector of claim 1 wherein said means for releasably securing said second end of said peripheral guard member to the vehicle body includes an elastic cord.

14. The bumper protector of claim 1 wherein said bumper protector is adapted to be secured proximate a vehicle's rear bumper and wherein said distal ends of said securing straps are adapted to be placed inside the vehicle's trunk.

15. A bumper protector for protecting a vehicle body from damage during low-speed impacts, said bumper protector comprising:
   (a) a main guard member adapted to cushion the impact of foreign objects with the vehicle body, said main guard member being adapted to fit over a portion of the vehicle body, said main guard member including means for securing said main guard member to the vehicle body; and
   (b) at least two securing straps adapted to be releasably and adjustably attached to said main guard member, each said securing strap having a proximal end and a distal end, said proximal end having means for releasably and adjustably attaching said securing strap to said main guard member, said distal end having means for releasably securing said distal end to the vehicle;
      wherein said means for releasably and adjustably attaching said proximal end of said securing strap to said main guard member includes hook-and-loop fasteners.

16. The bumper protector of claim 15 further comprising at least one supplemental guard member to wrap around a corner of the vehicle body, said supplemental guard member having a first end and a second end, said supplemental guard member including means for releasably and adjustably attaching said first end to said main guard member, said supplemental guard member including means for releasably securing said second end to the vehicle body.

17. The bumper protector of claim 16 wherein said means for releasably and adjustably attaching said first end of said supplemental guard member to said main guard member includes hook-and-loop fasteners.

* * * * *